(12) United States Patent
Parker et al.

(10) Patent No.: US 7,721,431 B2
(45) Date of Patent: May 25, 2010

(54) METHOD OF MAKING A PISTON

(76) Inventors: Duncan Parker, Doris Cottage, 61 Banbury Road, Ettington, Stratford-upon-Avon (GB) CV377SR; David Thornton Pindar, 5 Langdon Close, Daventry, Northamptonshire (GB) NN11 5SQ; Roger James Jones, 8 Orson Leys, Rugby, Warwickshire (GB) CV22 5RG; Gillian Hume, 123 Lower Street, Hillmorton, Rugby, Warwickshire (GB) CV21 4NT; David James Tharratt, 4a Mellish Road, Rugby, Warwickshire (GB) CV22 6BB ( * ) Notice: Subject to any disclaimer, the term of this patent is extended or adjusted under 35 U.S.C. 154(b) by 0 days.

(21) Appl. No.: 12/015,196

(22) Filed: Jan. 16, 2008
(Under 37 CFR 1.47)

(65) Prior Publication Data
US 2008/0110335 A1    May 15, 2008

Related U.S. Application Data

(62) Division of application No. 10/343,499, filed as application No. PCT/GB01/03361 on Jul. 26, 2001, now Pat. No. 7,341,037.

(51) Int. Cl.
*B23P 15/10* (2006.01)
(52) U.S. Cl. .............................. 29/888.042; 29/888.04; 29/888.044; 92/219; 123/193.6; 123/193.4
(58) Field of Classification Search ............ 29/888.042, 29/888.044; 92/219; 123/193.4
See application file for complete search history.

(56) References Cited

U.S. PATENT DOCUMENTS

| | | | |
|---|---|---|---|
| 1,667,202 | A | 4/1928 | Ford |
| 4,517,930 | A | 5/1985 | Nakano et al. |
| 4,581,983 | A | 4/1986 | Moebus |
| 4,704,950 | A | 11/1987 | Ripberger et al. |
| 5,230,148 | A | 7/1993 | Martins Leites et al. |
| 5,317,958 | A | 6/1994 | Martins Leites et al. |

(Continued)

FOREIGN PATENT DOCUMENTS

DE           733038        3/1943

(Continued)

*Primary Examiner*—Rick K Chang
(74) *Attorney, Agent, or Firm*—Robert L. Stearns; Dickinson Wright, PLLC

(57) ABSTRACT

An engine piston is manufactured by assembling an outer shell, comprising a crown and tubular side wall in which a ring groove region and skirt are defined, with a plate-like mounting member and bonding them together by brazing or welding. The mounting member is located within the tubular side wall displaced axially from the crown and is bonded near, but displaced radially from, its centre to the crown and at its periphery to the side wall at the end of the ring groove region. The mounting member carries gudgeon pin boss means facing away from the crown. The outer shell is formed by extrusion or the like that permits minimal wall thickness and the bonded structure is of light weight but great strength and stiffness, particularly in the ring groove region. A combustion bowl formed in the crown facilitates bonding to the mounting member and defines with the mounting member an annular cooling chamber adjacent the ring groove region and crown.

19 Claims, 4 Drawing Sheets

U.S. PATENT DOCUMENTS

| | | |
|---|---|---|
| 5,413,074 A | 5/1995 | Horiuchi |
| 5,913,960 A * | 6/1999 | Fletcher-Jones .............. 92/219 |
| 6,164,261 A | 12/2000 | Kruse |
| 6,314,933 B1 | 11/2001 | Lijima et al. |
| 6,539,910 B1 | 4/2003 | Gaiser et al. |
| 6,557,514 B1 | 5/2003 | Gaiser |
| 6,651,606 B2 | 11/2003 | Han |
| 6,698,391 B1 | 3/2004 | Kemnitz |
| 6,729,291 B1 | 5/2004 | Scharp et al. |

FOREIGN PATENT DOCUMENTS

| | | |
|---|---|---|
| FR | 52768 | 6/1945 |
| GB | 377228 | 7/1932 |
| GB | 558819 | 1/1944 |
| GB | 2244223 | 11/1991 |

* cited by examiner

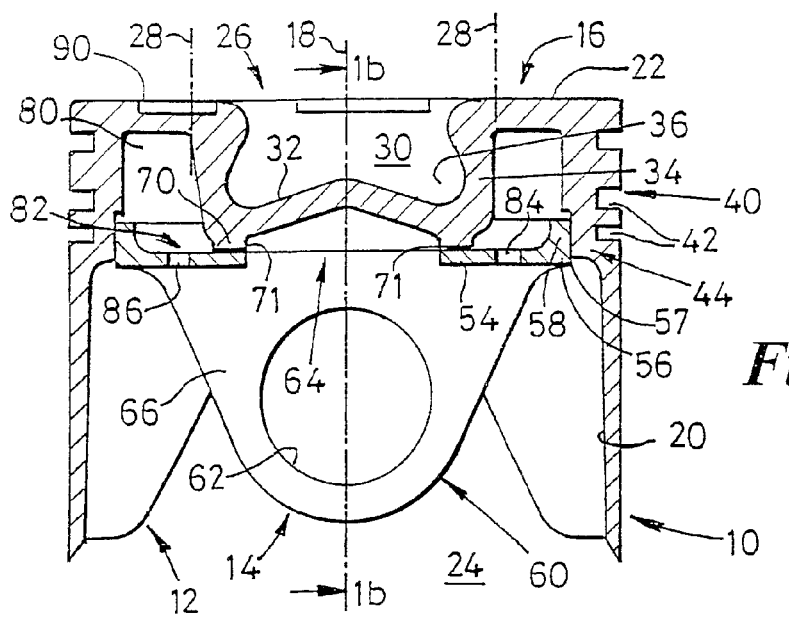
*Fig.1(a)*
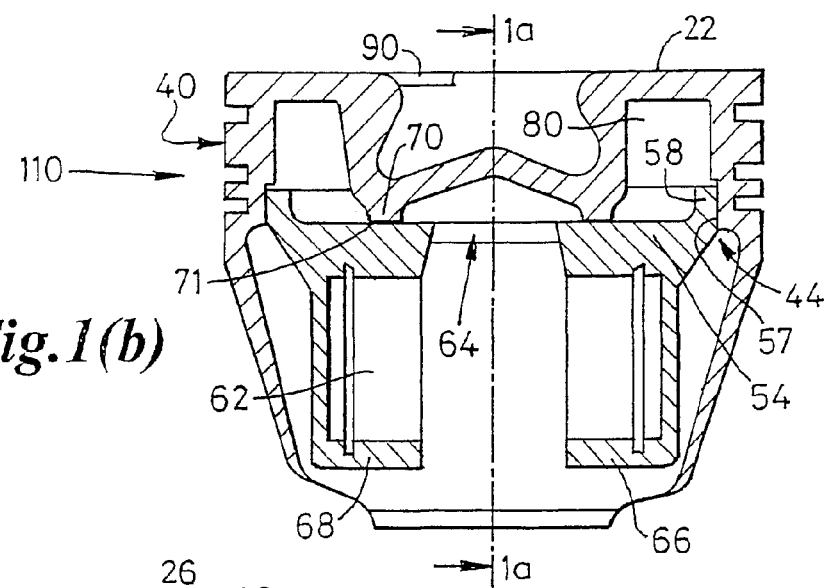
*Fig.1(b)*
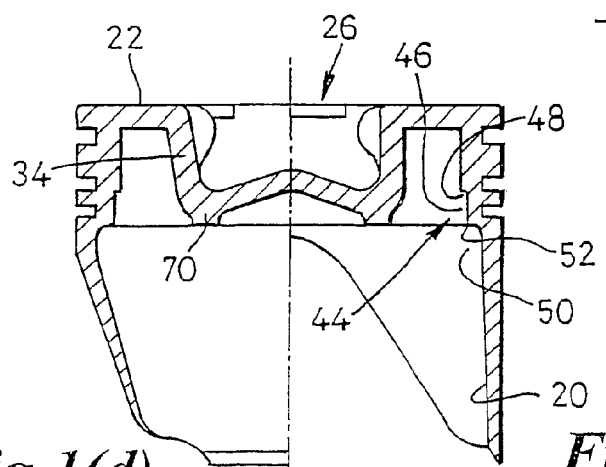
*Fig.1(d)*     *Fig.1(c)*

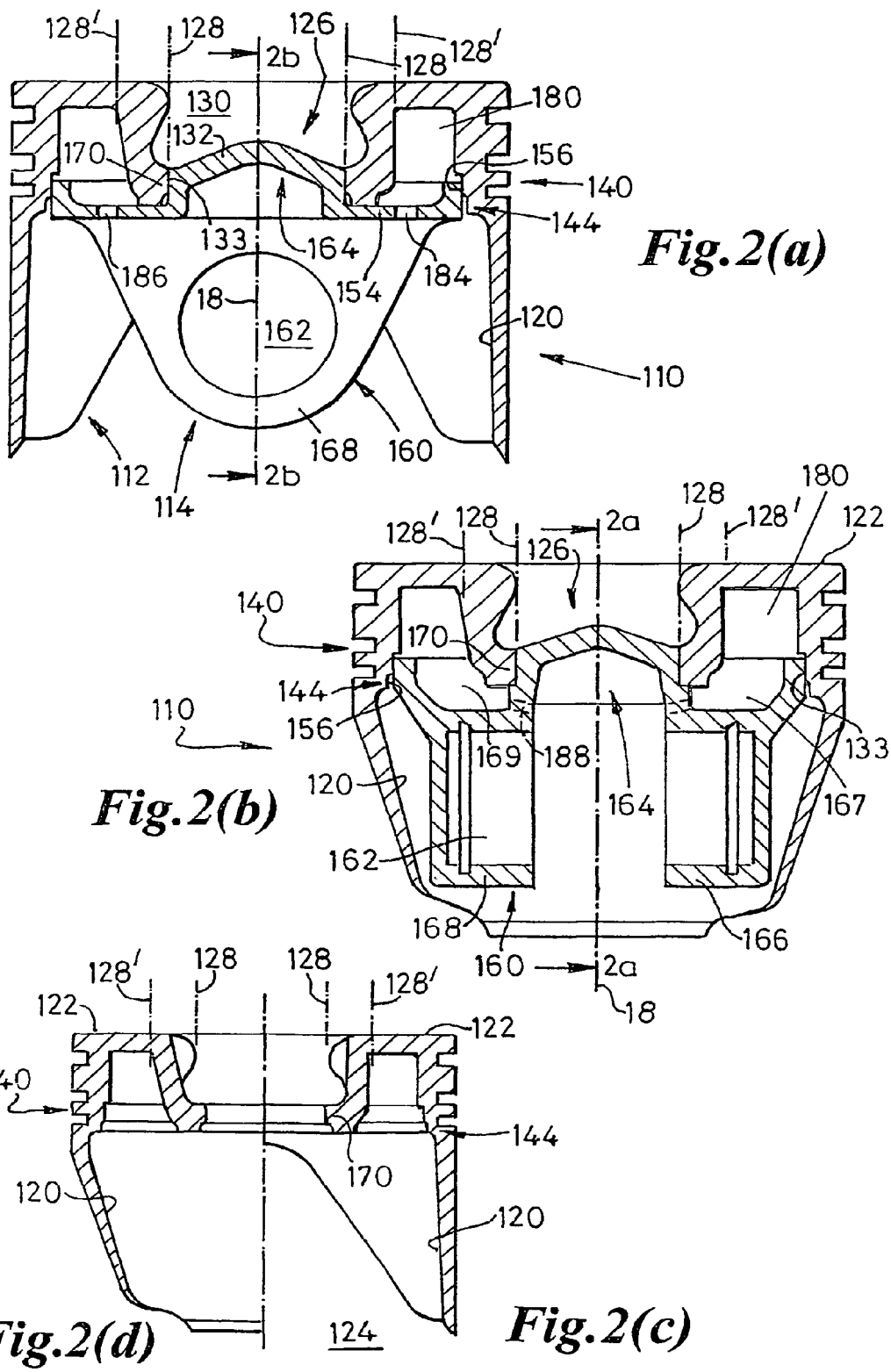

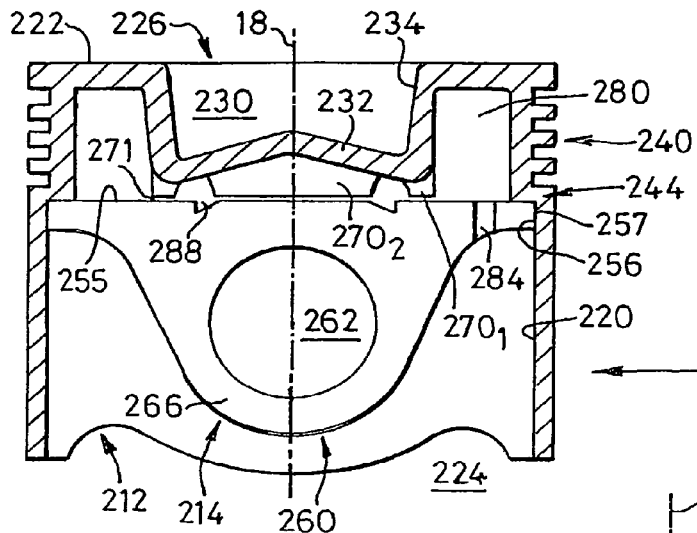
*Fig.3(a)*
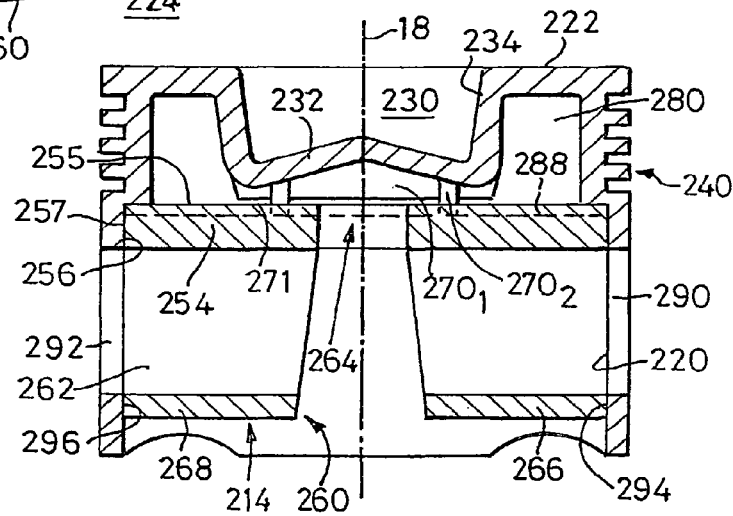
*Fig.3(b)*
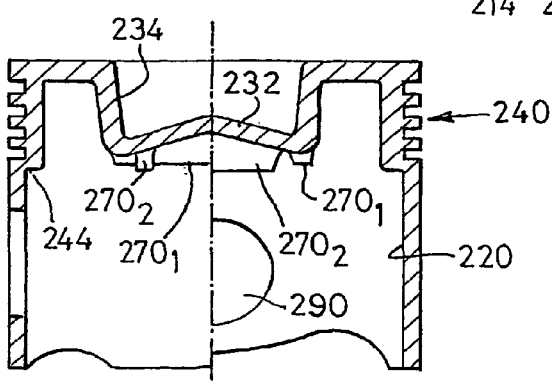
*Fig.3(d)* *Fig.3(c)*
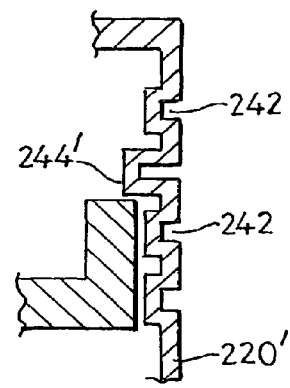
*Fig.6*

METHOD OF MAKING A PISTON

RELATED APPLICATIONS

This patent application is a divisional of U.S. patent application Ser. No. 10/343,499, filed Mar. 15, 2004, currently allowed, which claims priority to PCT/GB01/03361 filed Jul. 26, 2001 which claims priority to GB0018840.9 filed Aug. 2, 2000, all of which are incorporated herein by reference.

STATEMENT REGARDING FEDERALLY SPONSORED RESEARCH

NONE

BACKGROUND OF THE INVENTION

This invention relates to pistons for internal combustion engines and to the manufacture thereof. The invention is particularly concerned with the manufacture of a strong piston that is also light in weight and suitable for cost-effective mass production for small capacity, high compression engines.

Pistons for internal combustion engines for mass market automobiles are manufactured in large numbers and subjected to cost constraints, which in turn place limits on manufacturing processes. Such pistons are usually, but not necessarily, cast from a light metal alloy, typically aluminium based, and then subjected to a series of machining steps that culminate in a precision component.

For heavy duty use, for example in compression ignition engines, it is known to manufacture pistons of steel, usually forged, but such pistons have tended to have a weight penalty, notwithstanding extensive machining operations to remove extraneous metal, and have thus far been restricted to large capacity, low-revving engines found in trucks and the like.

In recent times there has been a need to provide such compression ignition engines for use in smaller, automobile engines, where it is necessary to run at higher speeds and with such high compression pressures. Although steel is a material having suitable properties, and has such strength that it could be used in relatively thin sections that mitigate most if not all of the weight penalty, there is difficulty in manufacturing a small one-piece piston that is capable of fulfilling such potential. In general such a piston has to be manufactured in steel by forging, with attendant limits to wall thicknesses and shapes that limit weight reduction.

It has been proposed to assemble or construct a steel piston from separately manufactured parts, as in U.S. Pat. No. 1,667,202 and U.S. Pat. No. 2,244,008. However the crown forms of the pistons shown therein are relatively simple in structure and without an in-crown combustion bowl often required by modern engines. Even without such added complexity, it is believed that the number of separate parts and assembly operations required are not conducive to providing a small piston capable of operating within a modern small engine in a cost-effective manner.

Notwithstanding that a small piston for mass production is subjected principally to constraints of cost, a larger piston for heavy duty application is subjected principally to constraints resulting from weight, so that the ability to produce a light weight piston cost effectively is not restricted in applicability. With this in mind, it is an object of the present invention to provide an engine piston of assembled form that is capable of providing strength and light weight in simple form and a method of producing such a piston that is capable of implementation more cost-effectively than hitherto.

According to a first aspect of the present invention an engine piston comprises an outer shell, including a crown centred on a longitudinal piston axis and a tubular side wall extending axially with respect to the periphery of the crown to an open end and, within the tubular side wall of the shell, a mounting member arranged to extend transversely to the longitudinal axis and bonded both to the crown and to the side wall spaced from the crown, and gudgeon pin boss means carried by the mounting member.

The term "longitudinal axis" is employed in relation to defining the piston with respect to the geometric centre of the crown, and notwithstanding that the cross section of the piston is other than circular, for example, is to a small extent elliptical or oval.

Preferably, the tubular side wall includes, adjacent the crown, a region of axially spaced, circumferentially extending ring grooves and the mounting member is bonded to the side wall at the end of the ring groove region remote from the crown and the periphery of the mounting member is bonded to the peripheral side wall substantially at the same axial position as at least one ring groove.

More preferably, the peripheral region the crown, the tubular side wall and the bonded mounting member define therebetween an annular cooling chamber.

Preferably, the gudgeon pin boss means is provided integrally with the mounting member, but notwithstanding this the bonding of the mounting member to the crown and to the side wall displaced from the crown create a monocoque type of structure which includes the ring groove region and provides great pressure resistance therefor without need for substantial wall thickness.

According to a second aspect of the present invention a method of manufacturing an engine piston comprises forming an outer shell part comprising a crown, centred on a longitudinal axis, and a tubular side wall, extending axially with respect to the periphery of the crown to an open end, forming a mounting member, carrying gudgeon pin boss means thereon, with a periphery dimensioned to fit within and interface with the tubular side wall, disposing the mounting member within the tubular side wall such that it interfaces with the crown at a crown interface and interfaces with the side wall at a wall interface and bonding the mounting member to the shell at said crown and wall interfaces.

Preferably, the method comprises forming the tubular side wall and at least the peripheral part of the crown, bounding a central crown region, as a integral shell body.

Preferably the outer shell and mounting member are provided separately, as unitary or pre-assembled bodies and are then bonded metallurgically to form the piston.

In this specification references to bonding metallurgically are intended to mean all known techniques employed in joining metal bodies directly to each other or by way of an intervening metal, and includes brazing and various forms of welding, such as friction welding and laser or other beam or jet welding.

The outer shell body may be formed by back extrusion or forging. Alternatively, the outer shell body may be formed by flow forming.

If, as may be considered the norm, combustion bowl means is required in the crown this may be formed integrally with the shell body, subject to shape constraints, or may be formed separately and metallurgically bonded.

The outer shell part and/or mounting member may be made from steel which is suitably ductile, but the method is equally applicable to ductile alloys of non-ferrous materials.

These and other features and advantages of this invention will become more apparent to those skilled in the art from the detailed description of a preferred embodiment. The drawings that accompany the detailed description are described below.

BRIEF DESCRIPTION OF THE DRAWINGS

Embodiments of the invention will now be described by way of example with reference to the accompanying drawings, in which:—

FIG. 1(a) is a sectional elevation through a first embodiment of an engine piston in accordance with the present invention, taken in the direction 1a-1a of FIG. 1(b), comprising an assembly of outer shell part and mounting member bonded together, FIG. 1(b) is a sectional elevation through the piston of FIG. 1(a) at right angles to the plane of that figure in the direction 1b-1b thereof, FIGS. 1(c) and 1(d) are sectional half elevations through the outer shell of FIGS. 1(a) and 1(b) respectively, FIG. 2(a) is a sectional elevation through a second embodiment of an engine piston in accordance with the present invention, taken in the direction 2a-2a of FIG. 2(b), comprising an assembly of outer shell part and mounting member bonded together, FIG. 2(b) is a sectional elevation through the piston of FIG. 2(a) at right angles to the plane of that figure in the direction 2b-2b thereof, FIGS. 2(c) and 2(d) are sectional half elevations through the outer shell of FIGS. 2(a) and 2(b) respectively, FIG. 3(a) is a sectional elevation through a third embodiment of an engine piston in accordance with the present invention, taken in the direction 3a-3a of FIG. 3(b), comprising an assembly of outer shell part and mounting member bonded together, FIG. 3(b) is a sectional elevation through the piston of FIG. 3(a) at right angles to the plane of that figure in the direction 3b-3b thereof, FIGS. 3(c) and 3(d) are sectional half elevations through the outer shell of FIGS. 3(a) and 3(b) respectively, FIG. 6 is a sectional elevation through a part of a third embodiment of piston according to the invention in which the tubular side wall is of substantially uniform thickness and the ring grooves and shoulder for the mounting are defined by folding the metal of the wall radially as a function of distance along the piston axis.

DETAILED DESCRIPTION OF A PREFERRED EMBODIMENT

Figure 4:
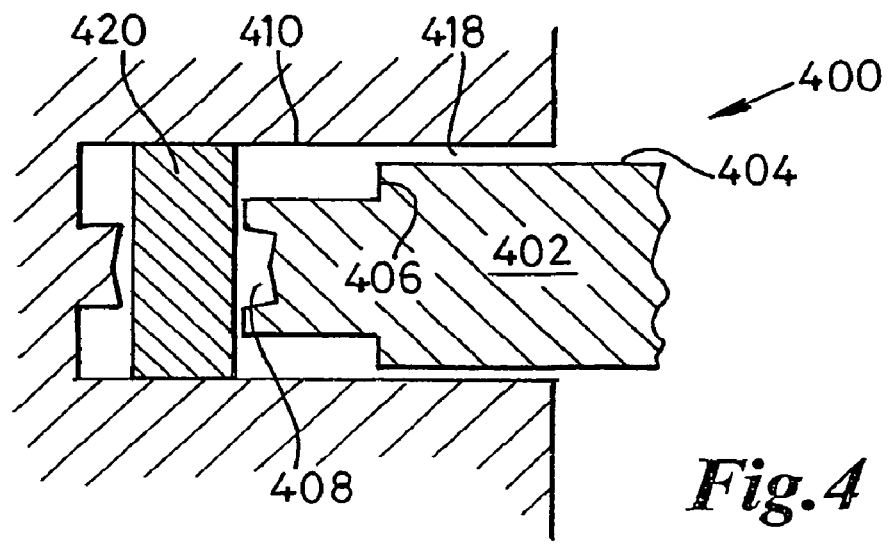
FIG. 4 is a schematic sectional elevation through apparatus for forming the outer shell body by back extrusion from a slug of metal.

Referring to FIGS. 1(a) to 1(d) a piston 10 for an internal combustion engine is formed from high carbon steel. It comprises an outer shell 12 and a mounting member 14 bonded to it metallurgically by brazing.

The outer shell 12 comprises a crown 16 centred on a longitudinal piston axis 18, and a tubular side wall 20 extending axially with respect to peripheral region 22 of the crown to an open end 24.

Centrally of the crown, and surrounded by the peripheral region 22, is a central region 26 (denoted by boundary lines 28) in the form of a combustion bowl 30 having a bowl floor 32 displaced axially with respect to the crown peripheral region, and towards the open end of the tubular side wall, by a bowl wall 34. The bowl wall conveniently has a radially reentrant form as indicated at 36.

The crown 16, including both the central region 26 and peripheral region 22, is of integral formation with the tubular side wall by back extrusion onto a mandrel, as described below, to define a unitary outer shell body.

The tubular side wall 20 includes adjacent the crown a region 40 of axially spaced, circumferentially extending ring grooves 42 machined into the wall and between the ring groove region and the open end 24, there is provided shoulder means 44 facing towards the open end effected by changes in internal diameter of the wall.

As best seen in FIGS. 1(c) and 1(d), the shoulder means 44 comprises a first, smaller reduction in thickness of the ring groove region at 46, defining first shoulder 48, and as second, larger reduction in thickness at 50 between the ring groove region and open end 24, defining a second shoulder 52.

The tubular side wall is, apart from the ring grooves, of substantially uniform thickness in the groove region between the crown and shoulder means, and also a reduced, but substantially uniform thickness between the shoulder means and the open end; the reduction in thickness is principally defined by the shoulder means but there is also a slight tapering of wall thickness from crown to open end to minimise overall weight by having less wall thickness where less strength is required.

The region 46 may, and not disadvantageously, lie at the same axial position as one or more of the ring grooves.

The mounting member 14 is cast by investment casting or the like and comprises an axially thin plate 54 dimensioned to fit within the open end of the tubular side wall such that at least some points at its periphery 56, and preferably all of its periphery, interface with the wall shoulder region 46 at wall interface 57 and byway of which interface it is bonded to the outer shell. In this embodiment it is bonded to the tubular wall about substantially the whole of its periphery and to this end, the plate has increased axial thickness at its periphery, defining a flange 58 extending axially to one side of the plate towards the crown.

The mounting member plate 54 also carries gudgeon boss means 60 formed integrally therewith at the side facing towards the open end 24 and axially between the flange 58 and the open end. The gudgeon pin boss means includes a bore 62 for the passage of a conventional gudgeon pin (not shown) transversely to the longitudinal axis 18. The mounting member plate 54 further includes a connecting rod space, in the form of aperture 64 extending through the mounting member along the longitudinal piston axis, said aperture defining from the gudgeon pin boss means two gudgeon pin bosses 66 and 68 spaced apart along the bore and, with the plate in position exposing the central region of the crown to the open end of the tubular side wall.

The central region of the crown, in particular the junction between the combustion bowl floor 32 and wall 34, has at least one axial extension to the bowl wall, conveniently as a circumferentially complete flange 70 which provides a uniform surface extending transversely to the piston axis and against which the mounting member plate 54 can bear at crown interface 71 to define its axial position within the tubular wall. In this embodiment, the axial position of the flange 70 is such that the peripheral flange 58 of the plate is clear of the first shoulder 48, that is, the mounting member is positioned to one axial datum only.

The mounting member is bonded metallurgically to the side wall at interface 57 and to the crown at interface 71 by brazing, by applying a brazing material to the interfaces between the mounting member and outer shell as they are assembled together, heating them to a temperature sufficient to melt the brazing material, followed by any heat treatment, cooling and/or quenching regime desirable to impart desired physical properties to the brazed components. Insofar as the mounting member and outer shell are fully heated, the individual components may be subjected to stress relieving prior to assembly and heating together.

The flange 70 which surrounds the combustion bowl floor also surrounds the connecting rod aperture 64 such that the crown, the tubular side wall and the bonded mounting member define therebetween an annular cooling chamber 80 which is substantially closed in the axial direction by the crown and by the mounting member. Channel means, indicated generally at 82, permits passage of cooling fluid to and from the annular chamber. The channel means comprises a fluid admission aperture 84 extending through the mounting member in a substantially axial direction and disposed such that for at least part of the piston stroke a jet of fluid is directed through the aperture and into the chamber. A fluid drainage aperture 86 extends through the mounting member displaced about the longitudinal axis from the admission aperture.

In keeping with producing a light weight piston, the tubular side wall is, at the open end 24 cut away about the longitudinal piston axis in line with the ends of the gudgeon pin bore to an axial level between the ends of the gudgeon pin bore and the ring groove region. It will be appreciated that the side wall may be cut more severely than illustrated, to the level of the shoulder means or other demarcation of the end of the ring groove region, such that there exists, to each side of the pin boss means two circumferentially discrete skirt portions essentially isolated from each other.

It will be appreciated that having formed the shell 12 and mounting member 14, there is essentially only a single assembly operation in respect of positioning the mounting member within the outer shell and bonding it thereto, more particularly to the side wall and crown combustion bowl, but that even with the use of relatively thin-sectioned outer shell and mounting member components, the resulting structure has considerable strength and resistance to deformation of the side wall in the ring groove region. In the same manner that a so-called monocoque structure gives strength and stiffness to a vehicle body, the structure here is analogous and may be considered as a monocoque type of structure. The strength is attributable to the structural shape as well as the materials and the piston can thus be formed by relatively low cost high or medium carbon steel, that is, a low alloy steel.

Indeed the construction is suitable for non-ferrous alloys provided they are capable of being shaped into such outer shell and mounting member and bonded together. Furthermore, it will be seen that the outer shell and mounting member may be made of different metals provided they can be successfully bonded or are compatible in terms of strength and thermal expansion and ability to form a metallurgical bond between them. The aforementioned brazing may be employed with similar or dissimilar metals. It may be possible to effect bonding between the mounting member and outer shell by a non-metallurgical bond. It may also be possible to provide one or both of the outer shell and mounting member components of non-metallic material subject to the above criteria for bonding. Where the outer shell is constructed with a discrete combustion bowl or other central region, that part may also be non-metallic.

As mentioned above the outer shell 12 is formed as an integral body by back extrusion. Referring to FIG. 4, this shows schematically a back extrusion apparatus 400 including a mandrel 402 having an outer surface 404 conforming to the internal shape and dimensions of the tubular side wall 20, including a step 406 corresponding to shoulder means 404 and a shallow lengthwise taper that effects minimal wall thickness according to strength requirements, as well as recess 408 corresponding to combustion bowl 30. A cylindrical sleeve 410 surrounds the mandrel, separated by gap 418 and relative movement between them exerts pressure on a metal slug 420 which deforms and flows into the gap and into conformity with the mandrel to define the shell body. The aforementioned small taper of mandrel surface 404 that creates the above discussed internal side wall taper also facilitates removal of the extruded shell. Such taper may be kept to a minimum, insofar as this is consistent with strength but may be eliminated altogether without affecting removal from the mandrel.

It will be appreciated that such extrusion, in distinction from forging, casting and like operations, is a precision operation that permits the formation of relatively thin walls of relatively uniform thickness which in conjunction with the strength and stiffness afforded by the monocoque type of structure permits formation of a lightweight piston from a dense material such as steel. However it is quite possible to provide the outer body shell by forging or other metal deforming processes.

As described hereinbefore, the combustion bowl wall has an axial extension in the form of flange 70. It will be appreciated that the mounting member could interface directly with the floor of the combustion bowl or such axial extension could be formed on the mounting member and extend to the bowl floor. It will also be understood that the combustion bowl may be omitted altogether, that is, have a substantially flat or domed crown, and such flange extend from the mounting member plate to the bottom of the crown surface, such arrangement still providing the support between crown and gudgeon pin boss means and annular cooling chamber.

Although it is convenient for the central region 26 of the crown to be integral with the peripheral region 22 it need not be, and can be manufactured separately and welded into the peripheral region to effect the unitary outer shell. Such separate formation of a combustion bowl may be appropriate to avoid having to machine radial re-entrant features in situ, but it is, of course, not necessary for a combustion bowl to have such re-entrant features and it may have a side wall that is suitable for forming completely by the extrusion process that defines the shell.

Although the piston 10 is essentially constructed from two components brought together in a single bonding operation, it is anticipated that there will still be machining operations required to the external surfaces of the side wall and crown, such as definition of combustion bowl re-entrant features, making valve pockets or recesses in the face of the crown, forming of ring grooves, cutting of the wall end and applying a final surface finish that also defines outside dimensions to within fine tolerances. Some of these may be performed before or after assembly and bonding of the outer shell and mounting member and some may be achieved during the extrusion that forms the outer shell, for example, valve pockets 90 in the crown face and ovality of cross section defined by the extrusion mandrel. The degree of ovality required of a piston is usually a function of its overall diameter; it is anticipated that the degree of ovality required on small diameter pistons may be achieved by the final machining of the outer surface, whereas for larger diameter pistons, such ovality may be better achieved by forming the outer shell with such cross section on a suitably shaped mandrel. Also, the formation of valve pockets or other shallow crown face features with the shell eliminates at least one relatively costly machining operation.

Formation of the outer shell by back extrusion about a mandrel permits the tubular wall internal surface to be defined to a suitable degree of accuracy without further machining. Of particular importance in connection with forming a lightweight piston is that in addition to being able to cut away any non-essential parts of the tubular side wall, is to have all wall sections as thin as possible for the functions required thereof. To this end it is possible to extrude the side wall with only slight variation in thickness from end to end (other than at the shoulder means) and with the ring groove region also less thick than might be thought acceptable, because of the support from the transverse mounting member.

It is a feature of the embodiment described that upon assembly prior to bonding, the interface 57 between the mounting member and the side wall extends axially, and thus positions the mounting member radially, whereas the crown interface 71 extends radially and positions the mounting member axially. The bond at interface 71, which is enclosed between the mounting member and crown, must be effected by the aforementioned brazing or some other technique which does not rely upon access to it. One alternative is friction welding, but that may be considered unsuitable for the axially extending wall interface 57, and although the latter is accessible from the open end, and susceptible to bonding by a different technique, it may be preferred not to have different bonding systems in use together.

This and other alternative structural possibilities are addressed in a second exemplary embodiment of piston in accordance with the invention is shown at 110 in FIGS. 2(a) to 2(d). Many of the parts are similar to those of piston 10 and the description will concentrate on the differences, For ease of reference, corresponding parts have reference numbers increased by 100. The piston 110 is a bonded assembly of outer shell 112 and mounting member 114, piston crown including a combustion bowl 130 therein. The outer shell 112 is generally similar to shell 12 insofar as it has tubular side wall 120 that includes a ring groove region 140 and shoulder means 144 and, integral therewith, a crown peripheral region 122. The peripheral region includes, displaced from the side wall, an axially extending combustion bowl wall 134. A central region 126 of the crown, defined by boundary lines 128 about longitudinal axis 18, comprises the floor 132 of the combustion bowl which is of discrete formation from the peripheral region and bonded thereto at interface 133 which extends around the periphery of this central region and substantially parallel to the longitudinal axis 18.

The combustion bowl floor 132 is carried by the mounting member 114, being formed integrally therewith and overlying a connecting rod space 164, corresponding to the connecting rod aperture 64 of member 14 of piston 10, the interface 133 that the bowl floor makes with the bowl wall comprises a crown interface.

The mounting member 114 comprises a plate 154 carrying on the surface opposite to the combustion bowl gudgeon pin boss means 160, including transverse bore 162 and bosses 166 and 168 spaced apart by connecting rod space 164. The outer periphery of the member at 156 is defined to be a tight fit within the tubular side wall, in particular interfacing with the wall region 146 at wall interface 157 which extends in a substantially longitudinal direction.

The base of the combustion bowl wall, adjacent the floor, has axial extension 170 which abuts the upper surface of the mounting member plate in order to locate it axially with respect to the crown periphery. Radial location is effected by the crown interface 133 and wall interface 157, although the wall interface 157, insofar as it is defined at shoulder means, may provide the axial location.

It will be appreciated that the mounting member is bonded to the tubular side wall at interface 157 and to the crown at interface 133, but significantly, in addition to the wall interface 157 being in line with the open end of the side wall the crown interface 133 is in line with the open end of the combustion bowl.

As each interface is accessible in the axial direction, it is possible to weld each by laser beam, particle beam, plasma jet or the like by rotating the piston assembly or the welding apparatus about the longitudinal piston axis. To facilitate such a welded bond, the surfaces bounding each interface are formed to provide a small divergence in the direction from which such welding is effected.

It will be understood that insofar as each interface is welded by a remote energy source in line therewith, the line of one or both interfaces may be inclined with respect to the longitudinal axis such that one or both of the interfaces are not only visible from without the piston but may have a taper that effects both radial and axial location between the mounting member and the outer shell. It is, of course, possible to effect bonding between the outer shell and mounting member at the interfaces by brazing as described above.

A cooling chamber 180 is defined between the outer shell and mounting member plate 154 and the plate 154 has fluid admission channel 184 and drainage channel 186 therethrough. This arrangement is shown to differ from that of piston 10 in that the chamber 180 is of greater axial extent in line with the gudgeon pin bore 162, that is, overlying the bosses 166 and 168 as shown at 167 and 169. Insofar as the admission and drainage channels are at an operationally higher level, these extended regions form reservoirs for cooling fluid.

In a modification to the above, the fluid drainage channel may comprise one or more channels 188 extending substantially radially from the cooling chamber to the connecting rod space 164. Such arrangement of cooling chamber reservoirs and drainage channels may be applied to the piston 10.

It will be appreciated that the central region 126 may be defined as being other than what is substantially the whole of the combustion bowl floor. It may, for example be a smaller region of the floor or it may be larger and incorporate the bowl wall 134, the boundary between central and peripheral regions being at the upper crown surface, as shown by boundary lines 128', and the mounting member/crown interface 133 coincident therewith, said central and peripheral regions defining together an essentially flat topped or domed crown.

In a further modification, not specifically shown, the central region of the crown may be formed with the peripheral region of the crown as part of the outer shell in the manner of piston 10 and the mounting member may have an upstanding closure to a connecting rod space in the manner of piston 110, whereby the closure provides not only upstanding flange means as described above for defining the cooling chamber but also overlies, and is capable of spreading load from, the central region of the crown.

Sectional views of a third exemplary embodiment of piston 210 in accordance with the present invention are shown in FIGS. 3(a) to 3(d), parts corresponding to those of FIGS. 1(a) to 1(d) having reference numbers increased by 200. The piston 210 comprises outer shell 212 and mounting member 214 bonded to each other.

The outer shell 212 comprises a unitary body consisting of crown peripheral region 222, crown central region 226 in the form of a combustion bowl 230 and tubular side wall 220. The tubular side wall consists of a thicker ring groove region 240 adjacent the crown and a thinner skirt region, open ended at 224, separated from the ring groove region by simple shoulder means 244. The combustion bowl 230 comprises a bowl floor 232 displaced axially from the peripheral region by bowl wall 234 and the wall, at the junction with the floor, has a number of axial extensions 270.sub.1, 270.sub.2 with gaps between them and possibly of slightly different axial lengths.

Mounting member 214 comprises a relatively thin mounting plate 254, the periphery of which is dimensioned to fit within the thinner part of the side wall adjacent the shoulder means 244; the periphery 256 of the plate defines an interface 257 with the tubular wall and has no axial flange or like projection to increase the axial length of the interface.

The lower face of the plate, facing the open end 224, caries integral gudgeon pin boss means 260 having transverse gudgeon pin bore 262 therethrough and through the plate, along piston axis 18, is a connecting rod aperture 264 which also effects formation of separated gudgeon pin bosses 266 and 268.

The upper face of the plate, indicated at 255 and facing the crown, is substantially flat and abuts the bowl wall extensions 270, and 2702 defining thereat interface 271 extending transversely with respect to the piston axis 18. Insofar as the interfaces 257 and 271 correspond in position and orientation to the interfaces 57 and 71 of piston 10, the outer shell and mounting member in the disposition shown are bonded to each other by brazing as described above, defining the strong monocoque type of structure including a closed annular cooling chamber 280 between the crown, ring groove region of the side wall and the upper surface 255 of the mounting member plate 254. Fluid channel means 284 permits admission of cooling fluid into the chamber and channels 288 permit drainage by way of the gaps between the bowl wall axial extensions 270, and 2702 to the connecting rod aperture.

As an alternative to the equally-applicable cutting away of the open end of the side wall to the extent shown for pistons 10 and 110, the gudgeon pin bosses 266 and 268 may extend into abutment with the side wall and the latter include through apertures 290 and 292 in alignment with the gudgeon pin bore 262. Furthermore, insofar as each boss defines an interface 294, 296 respectively with the side wall, it may be bonded thereto adjacent the apertures.

This arrangement of longer, apertured side wall and, optionally, gudgeon pin bosses extending thereto may be applied to the piston 10, and to piston 110 provided that the mounting member is bonded by brazing or the like that does not require direct access.

The mounting means 214 is of substantially uniform cross section in the direction of the gudgeon pin bore 262, that is, as viewed in FIG. 3(*a*), except of course where the connecting rod aperture 264 is cut. Instead of the mounting member being cast, it is formed by cutting from an extruded stock and then shaped to fit within the tubular side wall and the axially extending apertures 264 and 284 cut therein.

It will be appreciated that a cast mounting member, having a more complex surface as seen in the above described embodiments may be employed in piston 210 or such an extruded mounting member may be employed with the pistons 10 and 110.

Figure 5:
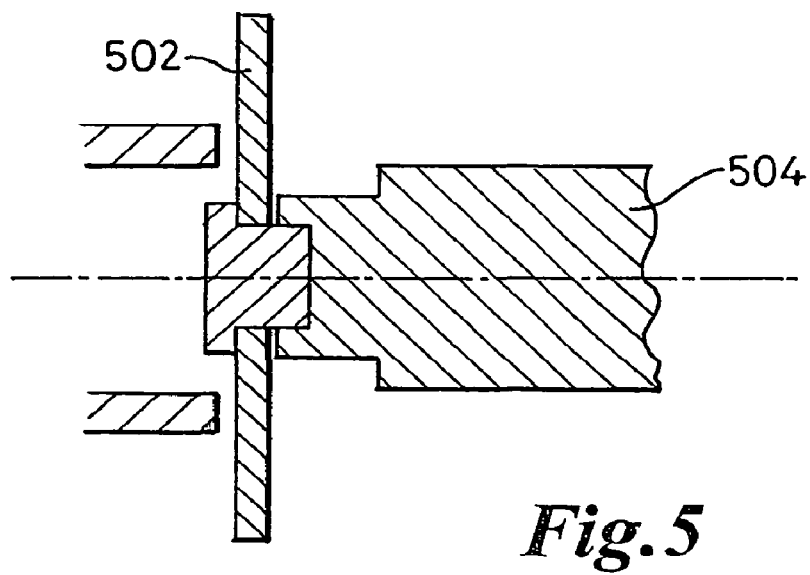
FIG. 5 is a schematic sectional elevation through apparatus for forming the outer shell body by flow forming a disc of metal centred on the crown and about the longitudinal piston axis.

Another difference illustrated in this embodiment is a tubular side wall which is, to each side of the shoulder means 244, of uniform thickness, that is, without the normally slightly tapering characteristic of extrusion or forging. The outer shell 212, although it may be formed by extrusion or forging, is produced by so-called flow forming in which, as FIG. 5 illustrates a disc-like slug of metal 502 is caused to rotate with a profiled mandrel 504 and during rotation the peripheral regions of the disc are displaced axially to lie along and conform with the mandrel that defines the respective wall thicknesses and shoulder means. As with the back extrusion described above, the tubular side wall may be formed thereon and removed without an internal wall taper, where this can save weight.

Such flow forming of the outer shell may be used in respect of piston 10 and 110. Although it may be preferred to define the tubular side wall with a thicker region into which ring grooves are subsequently machined, it will be appreciated that such flow forming permits, with the use of a radially contractible mandrel, formation of a tubular side wall 220' of substantially uniform thickness from end to end but varying in radius as a function of axial position to define the ring grooves 242' and shoulder means 244', as illustrated in FIG. 6.

It will also be appreciated that whereas the above embodiments have described the mounting member as bonded about the whole of its periphery to the side wall at the shoulder means, it may be bonded only at a plurality of discrete points and the periphery of the mounting member may be other than conforming in shape to the tubular side wall, extending to contact the wall only at points of bonding.

Although it is convenient for assembly to define a bonding interface between the periphery of the mounting member to the side wall at shoulder means which demarcates between the ring groove region and the more lightly loaded skirt, it is not essential and it may be bonded to the side wall other than at such shoulder if disposing the interface elsewhere improves stress patterns.

It is re-iterated that the various embodiments of piston according to the invention are not limited in size and the structures and methods of manufacture are capable of being scaled to a wide variety of dimensions.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method of making an engine piston comprising forming an outer shell part comprising a crown, centered on a longitudinal axis, and a tubular side wall extending axially with respect to a periphery of the crown to an open end, said crown having at least a peripheral region integral with the side wall; forming a mounting member having an upper member part and opposite thereto gudgeon pin bosses and a periphery dimensioned to fit within and interface with the tubular side wall; disposing the mounting member within the tubular side wall such that the gudgeon pin bosses face the open end, the upper part interfaces with the crown at least a radially extending crown interface defining mutual axial location reference, and the periphery interfaces with the side wall at a wall interface spaced axially from the crown periphery and radially from said radially extending crown interface, defining thereby a transversely extending closure plate closing partly from below a peripheral chamber in the crown; and permanently bonding the mounting member to the shell part at said wall interface and to the crown at a crown bonding interface radially inwardly of said wall interface; wherein said crown includes a combustion bowl having a combustion bowl wall and defining a combustion bowl floor displaced axially of the crown peripheral region by said bowl wall by the mounting member, and wherein said permanently bonding step includes bonding the mounting member to the crown by way of said crown bonding interface between the combustion bowl floor defined by the mounting member and the combustion bowl wall defined by the crown; and defining said crown bonding interface extending in a substantially axial direction accessible from outside of the combustion bowl and bonding the combustion bowl floor to the combustion bowl wall by access through the combustion bowl.

2. The method of claim 1 comprising bonding the mounting member to said crown and the tubular side wall at interfaces at a substantially same axial position.

3. The method of claim 1 comprising forming in the tubular side wall adjacent the crown a region of axially spaced circumferentially extending ring grooves and bonding the periphery of the mounting member to the side wall at an end of a ring groove region remote from the crown.

4. The method of claim 1 wherein the step of forming the tubular side wall and at least a peripheral region of the crown comprises bounding a central crown region, as an integral shell body and by forming at least pan of the central crown region as the combustion bowl having a bowl wall and a bowl floor displaced axially of the crown peripheral region by said bowl wall, and by bonding the mounting member to the crown at the combustion bowl.

5. The method of claim 4 comprising defining a radially extending the crown location interface between the mounting member and the crown, serving as a mutual axial location reference between a mounting member and the crown, at the junction between the combustion bowl wall and bowl floor.

6. The method according to claim 5 comprising defining said radially extending interface by an axial extension to the combustion bowl wall.

7. The method according to claim 4 wherein the step of bonding the mounting member to the crown at the radially extending crown location interface between the mounting member and the crown serves as a mutual axial location reference.

8. The method of claim 1 comprising bonding the combustion bowl floor to the combustion bowl wall metallurgically by applying heat from a source externally of the piston by access through the combustion bowl.

9. The method of claim 8 comprising bonding the interface by welding.

10. The method of claim 1 comprising defining the wall interface accessible from externally of the piston and bonding metallurgically by applying heat from a source externally of the piston.

11. The method of claim 10 comprising bonding the interface by welding.

12. The method of claim 1 comprising bonding the mounting member to the side wall substantially about a whole of its periphery.

13. The method of claim 1 comprising casting the mounting member.

14. The method of claim 1 comprising extruding the mounting member.

15. The method of claim 1 wherein the step of forming the outer shell part comprises the outer shell part flow forming about a rotating mandrel shaped to define an interior of the tubular side wall.

16. The method of claim 1 wherein the step of forming the outer shell part comprises back extruding the outer shell part about a mandrel shaped to define an interior of the tubular side wall.

17. The method of claim 16 comprising forming at least one valve pocket in the crown during the extrusion.

18. The method of claim 1 comprising forming a body shell and the mounting member from the same material.

19. The method of claim 1 comprising forming an outer shell part from steel.

* * * * *